United States Patent [19]

Harms et al.

[11] 4,196,064

[45] Apr. 1, 1980

[54] MARINE FOULING CONTROL

[75] Inventors: Robert L. Harms; Merle Hutchison, both of Ponca City, Okla.

[73] Assignee: Conoco, Inc., Ponca City, Okla.

[21] Appl. No.: 958,279

[22] Filed: Nov. 6, 1978

[51] Int. Cl.² .......................... C23F 13/00; C09D 5/08; C09D 5/10

[52] U.S. Cl. .................................. 204/147; 106/14.05; 106/290; 204/196

[58] Field of Search .............................. 204/147, 196; 106/14.05, 290

[56] References Cited

U.S. PATENT DOCUMENTS

| | | | |
|---|---|---|---|
| 1,021,734 | 3/1912 | Delius | 204/147 |
| 2,200,469 | 5/1940 | Cox | 204/1 |
| 3,069,336 | 12/1962 | Waite | 204/148 |
| 3,133,873 | 5/1964 | Miller | 204/196 |
| 3,458,413 | 7/1969 | Ueda | 204/147 |
| 3,497,434 | 2/1970 | Littauer | 204/147 |
| 3,530,051 | 9/1970 | Ueda | 204/147 |
| 3,625,852 | 12/1971 | Anderson | 204/196 |
| 3,661,742 | 5/1972 | Osborn | 204/147 |
| 3,718,570 | 2/1973 | Geld | 204/196 |
| 3,766,032 | 10/1973 | Yelser | 204/147 |

OTHER PUBLICATIONS

Marine Technology, Jan. 1973, pp. 30–38.
Industrial and Engineering Chemistry, vol 43, No. 4, Apr. 1951, pp. 901–904.

Primary Examiner—T. M. Tufariello
Attorney, Agent, or Firm—A. Joe Reinert

[57] ABSTRACT

A structure exposed to a marine environment is coated with a coating comprising stainless steel particles such as stainless steel flakes in a coating matrix. Marine growth is removed from the coating by impressing an electrical potential. Marine growth is also prevented. Preferably, the structure is coated with a first coating comprising metallic zinc prior to coating with a second coating comprising stainless steel flakes in an inorganic polymer matrix, and a cathodic potential is impressed.

14 Claims, 4 Drawing Figures 4,196,064

MARINE FOULING CONTROL

BACKGROUND OF THE INVENTION

The invention relates to prevention and removal of marine growth from structures exposed to a marine environment such as offshore platforms and ships.

BRIEF DESCRIPTION OF THE PRIOR ART

The following comprises, inter alia, a prior art statement in compliance with the guidance and requirements of 37 CFR 1.56, 1.97, and 1.98.

Two recent publications, i.e., Benson, et al, "Marine Fouling and Its Prevention", *Marine Technology*, January (1973), pages 30–38; and Castle, "Electrical Control of Marine Fouling", *Industrial and Engineering Chemistry*, 43, No. 4, April (1951), pages 901–904 present an excellent review of the state of the art relating to prevention of marine fouling, which includes publications over the last 25 centuries.

More recent antifouling methods, which have been proposed over the last 50 years, have varied from isotope introduction and toxic leaching paints to electrical systems, ultrasonics, and periodic underwater hull cleaning. However, no effective method of any appreciable longevity has yet been demonstrated. Toxic paint coatings remain the predominant preventive technique for use on ships in combination with periodic mechanical removal of the growth. The growth is ordinarily simply allowed to accumulate on offshore structures such as offshore platforms.

Lack of effective control measures is extremely expensive to industry. For example, a VLCC (Very Large Crude Carrier) will typically use about 46,000 metric tons of fuel per year. Marine fouling can drastically reduce speeds and consequently increase fuel consumption. Each percentage point decrease in fuel effeciency means on the order of 127,000 gallons lost per ship per year of increasingly scarce and expensive hydrocarbons.

In the case of offshore platforms, the platforms are normally overdesigned to compensate for the large amount of weight added by the growth of marine organisms over the projected life of the platform. Since the additional weight and volume added by the marine growth is normally near the surface, it has great lever moment and a tremendous multiplying effect on the structural size and weight needed to compensate and a consequent great increase in the amount of materials and cost involved in construction to support a given pay load of production capability.

Thus, it is seen that considerable economic advantage would flow from a method for removing or preventing such marine fouling, and indeed, a tremendous amount of work has been done in this art, as is touched upon by the references cited above.

Of the disclosures in the U.S. patent art, U.S. Pat No. 3,661,742 appears to be the closest reference of which the inventors are aware. It discloses painting a metallic surface with an electrically conductive metallic paint which contains a metal which is toxic to marine life, specifically, copper, mercury, silver, tin, arsenic, or cadmium, and then impressing an anode potential to remove or prevent growth of marine fouling organisms. However, the patent teaches that little or no effect is obtained on iron or zinc plates, which is a teaching away from the instant invention and teaches use of an anode potential rather than a cathode potential, which is a teaching away from the preferred inventive mode.

U.S. Pat. No. 3,497,434 discloses a method for preventing fouling of structures in a marine environment comprising coating with zinc or cadmium and then applying an anodic potential to the coated surface.

U.S. Pat. No. 3,766,032 is also noted as disclosing partially sheathing a surface exposed to a marine environment with strips of stainless steel having a spacing therebetween, and then impressing an electrical current through the strips to remove marine growth and prevent such growth.

Other references, for example, U.S. Pat. No. 1,021,734, disclose the general concept of removal of marine growth from a structure exposed to seawater by impressing a DC current to the structure.

Other references, namely U.S. Pat. No. 3,458,413, U.S. Pat. No. 3,530,051, U.S. Pat. No. 3,625,852, and U.S. Pat. No. 3,069,336 are noted, but appear to be less relevant.

OBJECTS OF THE INVENTION

An object of the invention is to provide apparatus and a process for removal and prevention of marine growth from structures exposed to a marine environment.

SUMMARY OF THE INVENTION

Fouling of structures exposed to marine growth is prevented by:

(a) coating the structure exposed to the fouling with a coating comprised of particles of a stainless steel alloy containing chromium within a matrix; and (b) periodically imparting an electrical potential to the coating sufficient to detach marine growth.

Thus, in one aspect, a coating comprising flakes of stainless steel within an inorganic matrix comprising silicates is adhered to a structure exposed to marine fouling, an electrical potential generator is connected in electrical contact with the coating, and a cathode potential sufficient to detach marine growth is periodically applied. In another aspect, the coating of stainless steel flakes in a silicate matrix is underlain with a coating of zinc.

DESCRIPTION OF THE DRAWINGS

Figure 1:
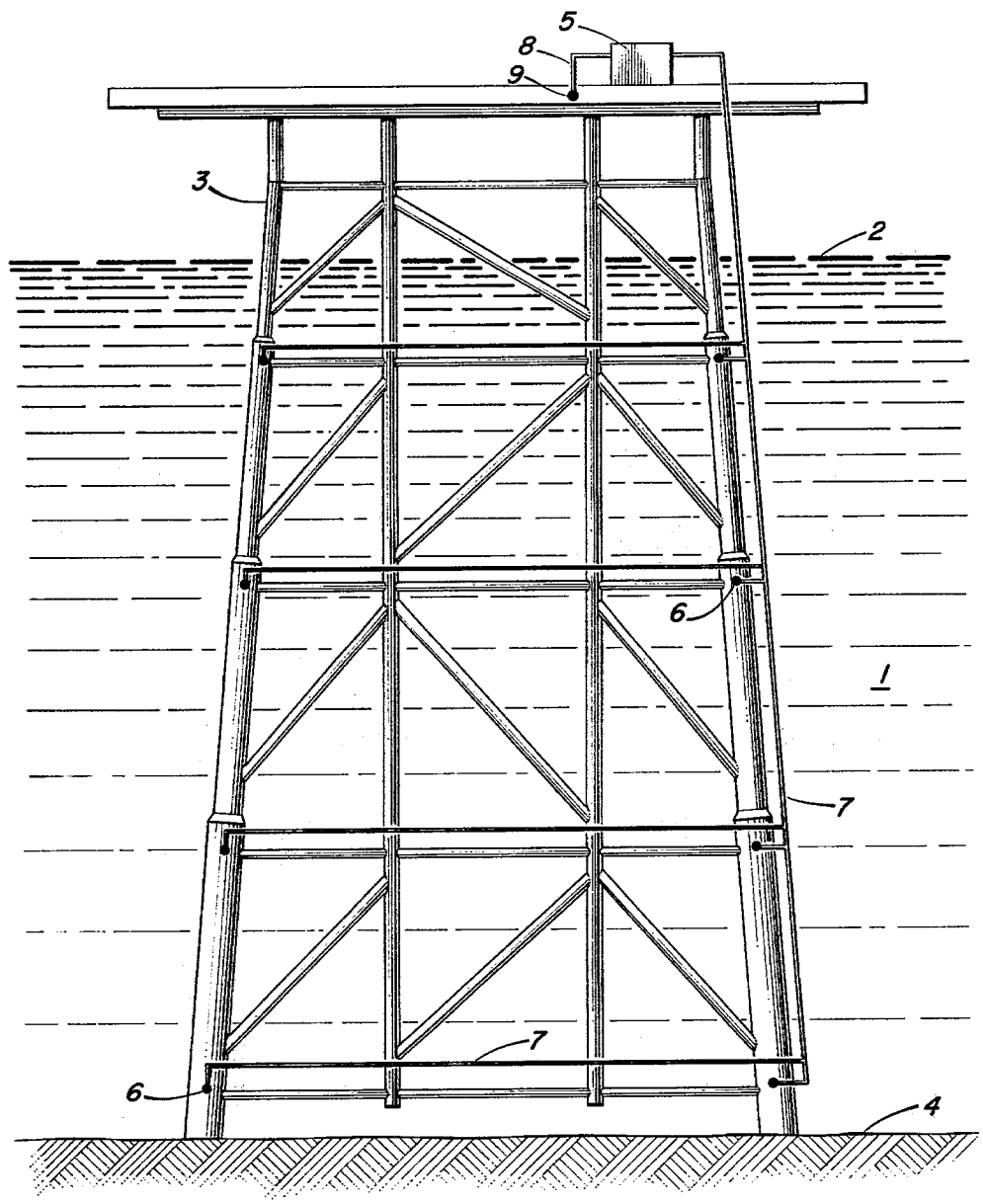
FIG. 1 is a schematic side view of an offshore platform having an example of the improvement of the invention aboard.

In the schematic side view of the offshore platform shown in FIG. 1, the platform 3 situated in a marine environment 1 extends from the sea floor 4 to the surface of the water 2. It has a DC generator 5 for generating an electrical potential aboard. The generator is electrically connected via electrical conductor 8 by connector 9 such that the entire platform is cathodic upon operation of the generator. The generator is also connected via insulated electrical conductors 7 to impressed current anodes 6 which are electrically insulated from the platform and are located in a distribution thereover. Upon operation of the generator the platform and consequently a coating comprised of particles of a stainless steel alloy containing chromium in an inorganic silicate matrix which coats parts of the platform exposed to fouling (coating not shown in this figure) is cathodic and the impressed current anodes are anodic.

Figure 2:
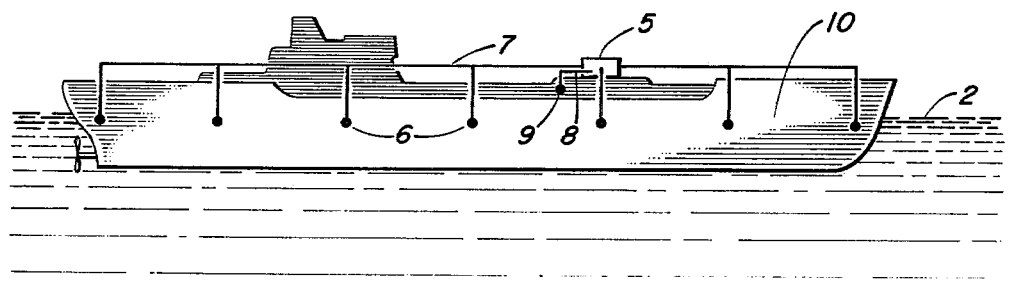
FIG. 2 is a schematic side view of a VLCC (Very Large Crude Carrier) having the improvement of the invention aboard.

In FIG. 2, a VLCC 10 is shown floating on the surface of the water 2 and having the improvement of the invention aboard. DC generator 5 generates a cathode and an anode potential. It is connected via electrical conductor 8 to a connector to the hull of the ship 9 such that the hull is cathodic upon operation of the generator. The generator is also connected via insulated electrical conductors 7 to impressed current anodes 6 which are electrically insulated from the hull and which are located in distribution thereover. Upon operation of the generator, the hull of the ship and consequently a coating comprised of particles of a stainless steel alloy containing chromium in an inorganic silicate matrix which covers parts of the hull exposed to fouling (coating not shown in this figure) is a large cathode and the impressed current anodes are anodic.

Figure 3:
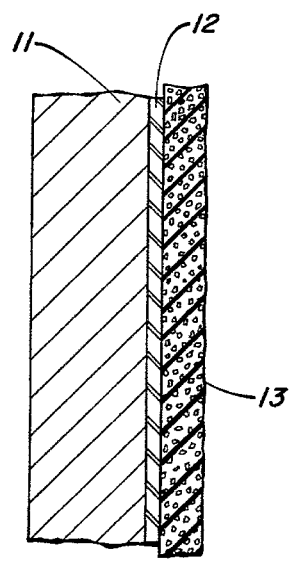
FIG. 3 shows a cross-sectional view of a section of a structural member having a coating comprising zinc overlain by a coating comprising stainless steel flakes in an inorganic silicate matrix.

In FIG. 3, a section of ship's hull or platform member 11 is shown overlain by a coating comprising metallic zinc 12 and an outer coating 13 comprising stainless steel flakes in a matrix comprising inorganic silicates.

Figure 4:
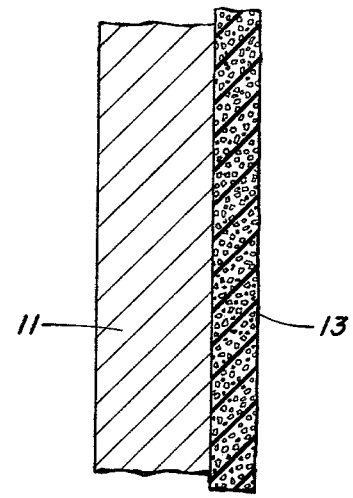
FIG. 4 shows a cross-sectional view of a section of a structural member exposed to marine fouling having a coating comprising stainless steel flakes in an inorganic silicate matrix adhered thereto.

A ship's hull or platform member section 11 in FIG. 4 is shown to be overlain with an electrically conductive coating 13 comprising stainless steel flakes in a matrix comprising inoganic silicates.

PREFERRED EMBODIMENTS OF THE INVENTION

In accordance with a presently preferred embodiment of the invention, a structure exposed to marine growth such as portions or all of seagoing ships or offshore platforms are protected from marine fouling in accordance with the following. Structures exposed to the fouling are coated with an electrically conductive coating comprising particles of a stainless steel alloy containing the element chromium within a matrix comprising inorganic silicates. Thereupon, an electrical potential generator in electrical contact with the coating is employed to impart sufficient of a cathode potential to the coating to inhibit or to detach marine growth. In accordance with one presently preferred embodiment, the stainless steel containing coating is comprised of flakes of stainless steel within an inorganic matrix comprised of silicates.

According to another presently preferred embodiment, the coating of stainless steel flakes in a matrix comprising inorganic silicates is adhered to a coating comprising substantial metallic zinc or cadmium which has previously been adhered to the structure.

The outer coating comprising stainless steel alloy particles within a matrix comprising silicates must contain a sufficient amount of stainless steel particles such that the coating is electrically conductive. The particles can be of any of a number of sizes, shapes, and derivations. It is presently preferred to employ stainless steel flakes, but powders, short fibers, and other forms can also be employed. Such particles of stainless steel are readily prepared by a number of well-known processes. The stainless steel employed is that which is disclosed in Kirk Othmer, *Encyclopedia of Chemical Technology*, 2nd Ed., Vol. XVIII, pages 787-796, (which is herein incorporated by reference).

Basically, such stainless steels are a class of alloy steels which in turn are steels having enhanced properties owing to the presence of one or more special elements or larger proportions of elements than are ordinarily present in carbon steel. Stainless steels, as the name implies, are more resistant to rusting and staining than plain carbon or lower alloy steels. Such superior corrosion resistance is due to the addition of chromium to alloys of iron and carbon. Although other elements such as copper, aluminum, silicon, nickel, and molybdenum also increase the corrosion resistance of steel, they are limited in their usefulness. The steels employed herein are iron-chromium and iron-chromium-nickel steels in which chromium is the major element for conferring corrosion resistance. Table 6 on pages 790 and 791 of the Kirk Othmer reference describes a number of conventional stainless steel products giving the AISI type number, the SAE type number, the carbon content, the chromium content, the nickel content, and ranges of other elements which are present in some of the products.

Further discussion and characterization of the three classes of stainless steel, Martensitic, Ferritic, and Austenitic, is found in the Kirk Othmer reference and elsewhere.

The outer coating matrix should contain sufficient stainless steel particles to impart electrical conductivity, but should not have more of such particles therein than is compatible with physical integrity of the coating. Presently, it is preferred that about 1 to 2 parts by weight of stainless steel particles be employed for each part by weight of matrix component of the coating. The matrix component is presently preferred to be inorganic silicates of type and composition conventionally employed in marine coatings, although other materials such as polyisobutylene elastomer or other materials can be employed in whole or part.

The outer coating of the invention can contain other materials conventionally employed in marine coatings in addition to the stainless steel particles and the coating matrix component. Myers, *Handbook of Ocean and Underwater Engineering*, McGraw-Hill (1969), Section 7-37 to 7-91 provides an excellent brief disclosure relating to protective marine coatings, and is herein incorporated by reference for the purpose of describing such coatings.

Normally, the structure exposed to marine fouling to be protected from marine growth according to the invention will be comprised of carbon steel, though the inventive apparatus and process is also applicable to other materials such as concrete and the like.

In preparation for applying the coating, the structural member should normally be cleaned such as by utilization of materials such as alkali, soap, detergent, solvent, acid, or gluconate. Wire brushing and abrasive blasting employing abrasives such as aluminum oxide, sand, silicon carbide, garnet, emery, diatomaceous silica, slag granules, mineral particles, shot, and walnut shells are also useful to prepare the surface.

Pretreatment processes and application of anticorrosive coatings can also be employed. Various pretreatments are described in the Myers reference for the varying types of coatings. It is necessary that good adhesion be obtained between the coating and the substrate.

According to the embodiment wherein a zinc coating or a cadmium coating is applied prior to the application of the outer coating, such zinc or cadmium coating is readily applied as described in Section 7-52 and 7-53 of the Myers reference. For example, zinc may be applied by hot dip galvanizing in accordance with military specification MIL-Z-17871 or otherwise. Zinc-rich coatings such as a hydrolyzed tetraethyl or silicate zinc coating of 92.2 percent by volume of zinc and the various formulations containing a large amount of zinc can be employed. Coatings comprising large amounts of zinc dust in silicates are very suitable. It is often preferable to treat the zinc coating when this embodiment is employed with chemical etching, or abrasive blasting prior to application of the outer coating. Cadmium coatings are usually applied by electroplating.

The outer coating can be applied by a number of conventional application techniques such as brushing, spraying, dipping, and the like. Formulations employing volatilizing solvents or those employing chemical reaction or cooling for solidification can be employed.

Specific coating applications and descriptions of suitable formulations for the nonstainless steel portion of the outer coating are found in Sections 7-69 through 7-75 of the above-noted Myers disclosure. Specific organic polymers forming the basis of the organic polymer matrix when such is employed include polyisobutylene elastomer (neoprene rubber), epoxy polymer, urethane polymers, coal tar epoxy materials, tetrofloroethylene resins, vinyl polymer, polyvinylene chloride, chlorinate rubber, and the like. The National Paint, Varnish, and Lacquer Association, Inc. issues a current review of government specifications in their publication, "Guide to U.S. Government Paint Specifications". Copies of individual specifications are reported to be obtainable from the Commanding Officer, Naval Supply Depot, 5801 Tabor Avenue, Philadelphia, PA. 19120. Such governmental specifications are further exemplary of polymer matrixes for formulation with particles of stainless steel alloys to form the outer coatings of this invention.

According to one presently preferred mode, stainless steel flakes are employed in a coating matrix comprising silicates, according to another preferred anode the matrix comprises polyisobutylene elastomer.

The electrical potential generator can be placed in electrical contact in any of a number of ways. For example, when the structure is carbon steel, insulated electrical conductors can be run from the generator to the structure such that the cathode potential is conducted through the coatings to the surface. Contacts can also be embedded in the coatings in a suitable array over the structure. It is often convenient to simply connect one pole of the generator to the structure to impart cathode or anode potential thereto. It is presently preferred that a cathode potential be imparted.

The electrical potential generator can be any conventional means for generating electrical potential. For example, a fuel cell, a solar cell array, an alternator with a DC converter, a generator, or a battery of galvanic cells can be employed.

A suitable array of impressed current cathodes or anodes are desirably situated in proximity to areas of the structure exposed to fouling but in electrical insulation therefrom. Preferably anodes are employed. Such anodes are electrically connected to the anodic pole of the generator. For platforms, such anodes can simply be hung over the side or attached by insulators at suitable points with insulated electrical conductors leading to the generator. For ships it is more preferred that designs such as are disclosed for anodes by U.S. Pat. No. 3,133,873, U.S. Pat. No. 3,718,570, and the like be employed wherein the anode extends out of the hull, is electrically insulated therefrom, and is connected to the anodic pole of the generator.

According to one presently preferred mode, the generator is connected to the anodes and cathodes to also provide impressed current anodic protection to the structure at lower potentials during periods between periods of defouling. It is preferred that an area of the structure next to the impressed current anode be protected by an electrically insulative material to protect the structure. Such coatings and their emplacement are well known to those skilled in the art.

According to another presently preferred mode, reference cells, such as copper-copper sulfate and aluminum-aluminum chloride cells, are situated at suitable sites to monitor the current impressed into the anodes. Preferably such reference cells are employed to direct a controller which automatically controls the output of the generator.

To remove or prevent marine fouling according to this invention, any potential and time to effect the degree of removal and prevention desired may be employed. Normally, an electrical potential is employed such that current density of between 10 milliamperes per square foot to about 1000 milliamperes per square foot for a period of between 0.5 minutes per hour to about 2 minutes per hour, or a rate between about 1000 milliamperes per square foot to about 2500 milliamperes per square foot for a period of between about 0.5 minutes per day to about 2 minutes per day are employed.

It is often preferred to employ current densities of about 50 milliamperes per square foot to about 200 milliamperes per square foot for a period of between 1 minute per hour to about 1.5 minutes per hour or a rate of between 1200 milliamperes per square foot to about 2000 milliamperes per square foot for a period of about 1 minute per day to about 1.5 minutes per day for optimum efficiency of utilization.

EXAMPLES

The following exemplification is provided to more fully explain the invention and provide information to those skilled in the art on how to carry it out. However, it is to be understood that such is not to function as a limitation on the invention as described and claimed in the entirety of this application.

A number of panels of carbon steel are prepared by cutting ⅜-inch panels into 4"×6" coupons. A well bead is applied across the surface of each panel.

All panels are sand blasted to an SSPC-SP-5-(white metal blast) standard.

Various coatings are thereupon applied to the panels in accordance with the following:

Panels numbered 1 and 2 are coated with a coating comprising stainless steel flakes and an inorganic silicate matrix, specifically DURAMET No. 550 stainless steel top coat, available from Imperial Coatings Corporation, 16362 Chef Menteur Highway, New Orleans, LA. 70129. The coating has 16 percent stainless steel and 8 percent inorganic silicates. The coating applied is 2 mils in thickness and the panels are allowed to cure 30 days prior to exposure to seawater.

A series of panels designated 5, 6, and 12 are first coated with a coating comprising zinc in an inorganic silicate matrix, and then are coated with a coating comprising stainless steel flakes in an inorganic silicate matrix. The inorganic zinc coating is 2 mils in thickness and is allowed to dry for 72 hours prior to coating with the coating comprising stainless steel flakes in an organic silicate matrix which also has a thickness of 2 mils. Following coating with the stainless steel flake containing coating material, the panels are allowed to cure for 30 days prior to exposure to seawater. The coating comprising stainless steel flakes in an inorganic silicate matrix is the same as is applied to panels 1 and 2. The precoating comprising zinc in an inorganic silicate matrix is specifically classified as a silicate zinc primer and is identified as DURAZINC No. 555Z inorganic zinc primer, available from the Imperial Coatings Corporation, 16362 Chef Menteur Highway, New Orleans, LA. 70129. It comprises two components, the first component being 100 percent zinc dust and the second component comprising 25 percent inorganic silicate, 20 percent cellosolve solvent, 18 percent pigment, and other formulative components.

A panel, designated panel 9, is coated with 2 mils of the inorganic zinc coating in a silicate matrix of the previous set of panels, and is cured for 72 hours. Thereupon, a top coat comprising aluminum flakes in a silicate matrix similar to the coating employed with panels 1 and 2 is applied and the panel is allowed to cure for 30 days prior to exposure in seawater. This panel, which is outside of the scope of the invention, serves as a control to the inventive materials in the process.

Another panel, designated panel 15, is coated with an aluminum flake coating 2 mils in thickness in a manner similar to the manner and type of vinyl coating applied to panel 9. Curing is effected for 30 days prior to exposure to seawater. This panel serves as yet another control for comparison to the materials and process of the invention.

All coatings are applied to the panels by spraying.

All panels are exposed in flowing seawater at Wrightsville Beach, North Carolina, for a period of 101 days. Thereupon, each test panel is connected to an electrical potential generator in proximity to a reference electrode and an impressed current anode. Impressed currents were generated and descaling was effected with results and in accordance with data presented in the following tables:

Panels 1 and 2 - System - Stainless Steel Flake Coated Mild Steel

Panel No. 1

| Open Circuit Potential Millivolts | Applied Voltage Volts | Current Milliamps | Time, Min. | Potential Millivolts | Remarks |
|---|---|---|---|---|---|
| +675 | 0 | 0 | 0 | +675 | |
| | 2.0 | 30 | 1 | +1500 | |
| | 2.0 | 20 | 3 | 1500 | |
| | 4.0 | 600 | 1 | 2000 | |
| | 3.6 | 340 | 3 | 2000 | |
| | 7.2 | 3000 | 1 | 3000 | Descaling |
| | 8.0 | 3000 | 5 | 3000 | Descaling |
| | 8.5 | 3100 | 1 | 4000 | |
| | 8.5 | 3100 | 15 | 4000 | Max. output |

Panel No. 2

| Open Circuit Potential Millivolts | Applied Voltage Volts | Current Milliamps | Time, Min. | Potential Millivolts | Remarks |
|---|---|---|---|---|---|
| +675 | 0 | 0 | 0 | 0 | |
| | 2.8 | 200 | 1 | 1000 | |
| | 2.4 | 120 | 3 | 1000 | |
| | 5.0 | 1000 | 1 | 1500 | |
| | 5.0 | 860 | 10 | 1500 | |
| | 7.0 | 2200 | 1 | 2000 | Descaling |
| | 8.0 | 2800 | 10 | 2000 | Descaling |
| | 8.4 | 3000 | 1 | 3000 | Descaling |
| | 8.4 | 3000 | 60 | 3000 | Descaled |

Panels 5, 6, and 12 - System - Inorganic Zinc Plus Stainless Steel Topcoat on a Mild Steel Panel Panel No. 5

| | | | | | |
|---|---|---|---|---|---|
| +660 | 0 | 0 | 0 | 660 | |
| | 5.4 | 1200 | 1 | 2000 | |
| | 5.6 | 1200 | 5 | 2000 | |
| | 5.6 | 1200 | 15 | 3000 | Descaled |

Panel No. 6

| | | | | | |
|---|---|---|---|---|---|
| +600 | 0 | 0 | 0 | +600 | |
| | 1.4 | 3 | 1 | 1000 | |
| | 3.0 | 100 | 1 | 2000 | |
| | 3.0 | 50 | 15 | 2000 | |
| | 4.0 | 200 | 1 | 3000 | |
| | 3.2 | 100 | 5 | 3000 | Descaled |

Panel No. 12

| | | | | | |
|---|---|---|---|---|---|
| +660 | 0 | 0 | 0 | 660 | |
| | 4.4 | 700 | 30 | 2000 | Descaled |

Panels may be descaled at lower potentials with extended periods of time.

Panel 9 - System - Inorganic Zinc, Flake Aluminum on Mild Steel Panel

| Open Circuit Potential Millivolts | Applied Voltage Volts | Current Milliamps | Time, Min. | Potential Millivolts | Remarks |
|---|---|---|---|---|---|
| +820 | 0 | 0 | 0 | +820 | |
| | 3.6 | 64 | 15 | 2000 | |
| | 10.0 | 2400 | 60 | 3000 | Began descaling and forming white material |
| | 10.0 | 2400 | 60 | 5000 | Partially descaled |

Panel 15 - System - Aluminum Flake on Mild Steel Panel

| +860 | 0 | 0 | 0 | +860 | |
|---|---|---|---|---|---|
| | 4 | 70 | 10 | 2000 | |
| | 10.0 | 2400 | 60 | 3000 | No effect |

These data demonstrate that remarkable improvement in descaling effected with the stainless steel flake coating, and demonstrate the even more remarkable improvement in descaling effected with the zinc coating underlying the stainless steel coating.

A series of runs demonstrates that the panels coated with the stainless steel containing coatings remain clean and bright after removal of fouling in accord with the invention, an even further improvement is apparent with the zinc-stainless steel system. In comparison, even relatively high voltages are relatively ineffective with the control panels. The control panels also exhibit serious corrosion indications.

We claim:

1. In combination with a structure exposed to marine fouling, the improvement comprising:
   (a) an electrically conductive coating adhered to the structure in zones exposed to the fouling comprised of particles of a stainless steel alloy containing chromium within a coating matrix;
   (b) an electrical potential generator in electrical contact with the coating sufficient to impart potential thereto sufficient to inhibit or to detach marine growth.

2. The improvement of claim 1 wherein the coating is underlain by a coating comprising a metal or alloy containing metallic zinc or cadmium.

3. The improvement of claim 1 wherein the coating is adhered to a coating comprising zinc in a matrix comprising silicates which is adhered to the structure.

4. The improvement of claim 3 wherein the coating comprised of flakes of stainless steel within a coating matrix comprises a matrix of silicates.

5. A method for preventing fouling of structures exposed to marine growth comprising:
   (a) coating the structure exposed to the fouling with an electrically conductive coating comprised of particles of a stainless steel alloy containing chromium within a coating matrix;
   (b) periodically imparting an electrical potential to the coating sufficient to detach or inhibit growth of marine organisms.

6. The process of claim 5 wherein the coating comprises flakes of stainless steel within a matrix comprised of silicates and wherein the electrical potential is a cathodic potential and is sufficient to detach marine organisms growing thereon.

7. The process of claim 6 wherein a coating comprising a metal or alloy containing zinc or cadmium is adhered to the structure prior to adherence of the coating comprising the stainless steel flakes in the silicate matrix.

8. The process of claim 6 wherein a layer of zinc is adhered to the structure prior to adhering the coating comprised of stainless steel flakes in a silicate matrix.

9. The process of claim 7 wherein the structure is an offshore platform.

10. The process of claim 7 wherein the structure is a seagoing ship.

11. The process of claim 7 wherein the structure is fabricated of carbon steel.

12. The process of claim 5 wherein the coating comprises flakes of stainless steel in a matrix comprising silicates, wherein the coating overlies a coating comprising a metal or alloy containing zinc which is adhered to the structure prior to adherence of the coating containing flakes of stainless steel, and wherein the electrical potential is a cathodic potential such that a current density of 10 milliamperes per square foot to about 2500 milliamperes per square foot is impressed.

13. The process of claim 5 wherein the coating comprises flakes of stainless steel in a matrix comprising silicates, wherein the coating overlies a coating comprising a metal or alloy containing zinc which is adhered to the structure prior to adherence of the coating containing of stainless steel, and wherein the electrical potential is an anodic potential such that a current density of 10 milliamperes per square foot to about 2500 milliamperes per square foot is impressed.

14. The process of claim 13 wherein the structure is a seagoing ship.

* * * * *